United States Patent
Maia Da Silva et al.

(10) Patent No.: US 10,908,026 B2
(45) Date of Patent: Feb. 2, 2021

(54) SYSTEM AND METHOD FOR CALCULATING THE SPECTRAL PHASE OF LASER PULSES

(71) Applicant: SPHERE ULTRAFAST PHOTONICS, S.A., Oporto (PT)

(72) Inventors: Francisco Jose Maia Da Silva, Oporto (PT); Helder Manuel Paiva Rebelo Cerejo Crespo, Oporto (PT); Paulo Tiago Ferraz De Meira Guerreiro, Oporto (PT); Rosa María Romero Muñiz, Oporto (PT)

(73) Assignee: SPHERE ULTRAFAST PHOTONICS, S.A., Oporto (PT)

( * ) Notice: Subject to any disclaimer, the term of this patent is extended or adjusted under 35 U.S.C. 154(b) by 0 days.

(21) Appl. No.: 16/324,713

(22) PCT Filed: Aug. 9, 2017

(86) PCT No.: PCT/IB2017/054867
§ 371 (c)(1),
(2) Date: Feb. 11, 2019

(87) PCT Pub. No.: WO2018/029615
PCT Pub. Date: Feb. 15, 2018

(65) Prior Publication Data
US 2019/0170588 A1 Jun. 6, 2019

(30) Foreign Application Priority Data

Aug. 10, 2016 (PT) .......................................... 109575
Aug. 11, 2016 (EP) ..................................... 16183901

(51) Int. Cl.
*G01J 11/00* (2006.01)
*H01S 3/00* (2006.01)

(52) U.S. Cl.
CPC ............. *G01J 11/00* (2013.01); *H01S 3/0014* (2013.01); *H01S 3/0057* (2013.01); *H01S 3/0092* (2013.01)

(58) Field of Classification Search
CPC ...... G01J 11/00; H01S 3/0014; H01S 3/0057; H01S 3/0092
See application file for complete search history.

(56) References Cited

U.S. PATENT DOCUMENTS

2002/0057435 A1   5/2002  Trebino
2007/0171422 A1*  7/2007  Birge .................... G01J 3/4535
                                                   356/450

(Continued)

FOREIGN PATENT DOCUMENTS

EP         3012925 A1    4/2016
WO    2013/054292 A1    4/2013

OTHER PUBLICATIONS

Antoine Monmayrant et al, "PhD Tutorial; A newcomer's guide to ultrashort pulse shaping and characterization", Journal of Physics B, Atomic Molecular and Optical Physics, Institute of Physics Publishing, Bristol, GB, (May 28, 2010), vol. 43, No. 10, ISSN 0953-4075, p. 103001, XP020173516.

(Continued)

*Primary Examiner* — Michael P LaPage
(74) *Attorney, Agent, or Firm* — Leason Ellis LLP

(57) ABSTRACT

The present disclosure generally relates to laser systems and laser pulse characterization methods and respective systems. An embodiment of the method comprises generating two collinear replicas of the pulse being characterized; applying two different predetermined spectral phases to each replica, so as to simultaneously scan delay and dispersion; applying a nonlinear process to the pulse to be characterized; measuring the resulting signal from the application of the predetermined spectral phases and nonlinear process; apply- (Continued)

ing a numerical iterative algorithm to the measured signal to retrieve the spectral phase of the pulse to be characterized; such process being done as a scanning procedure or in parallel utilizing a single laser shot. The two time-delayed replicas may be generated using a birefringent etalon; a controllable amount of dispersion and delay between replicas may be provided by a pair of birefringent wedges, one of them being translated for phase control; dispersion and delay between replicas can also be imparted in parallel by using a single birefringent wedge, which encodes these along a spatial dimension; opposite dispersion to that of the wedges may be introduced by an appropriate optical element, such as chirped mirrors or a dispersive geometric arrangement; the frequency spectrum may be measured as well as the dispersion and delay dependent second-harmonic of the signal being phase modulated.

21 Claims, 8 Drawing Sheets

(56) References Cited

U.S. PATENT DOCUMENTS

| | | | |
|---|---|---|---|
| 2009/0066963 A1* | 3/2009 | Petek | G01B 9/04 356/450 |
| 2014/0321486 A1* | 10/2014 | Da Costa Ribeiro De Miranda | H01S 3/0092 372/21 |
| 2018/0034227 A1* | 2/2018 | Trull-Silvestre | G01J 11/00 |

OTHER PUBLICATIONS

Günter Steinmeyer, "Review Article; A review of ultrafast optics and optoelectronics; Review Article", Journal of Optics. A, Pure and Applied Optics, Institute of Physics Publishing, Bristol, GB, (Jan. 1, 2003), vol. 5, No. 1, doi:10.1088/1464-4258/5/1/201, ISSN 1464-4258, pp. R1-R15, XP020081019.
Miguel Miranda et al, "Simultaneous compression and characterization of ultrashort laser pulses using chirped mirrors and glass wedges", Optics Express, (Jan. 2, 2012), vol. 20, No. 1, doi:10.1364/OE.20.000688, ISSN 1094-4087, p. 688, XP055051766.
J. A. Armstrong, "Measurement of picosecond laser pulse widths", Appl. Phys. Lett. 10 (1), 16 (1967).
K. Naganuma.; K. Mogi; Yamada, "General method for ultrashort light pulse chirp measurement," Quantum Electronics, IEEE Journal of , vol. 25, No. 6, 1225-1233, (1989).
A. Baltuska, Z. Wei, M. S. Pshenichnikov, D. A. Wiersma, and R. Szipocs, "All-solid-state cavity-dumped sub-5-fs laser," Appl. Phys. B 65, 175-188 (1997).
J. W. Nicholson, J. Jasapara, W. Rudolph, F. G. Omenetto, and A. J. Taylor, "Full-field characterization of femtosecond pulses by spectrum and cross-correlation measurements," Opt. Lett. 24, 1774-1776 (1999).

D.J. Kane; R. Trebino; "Characterization of arbitrary femtosecond pulses using frequency-resolved optical gating ", Quantum Electronics , IEEE Journal of , vol. 29, No. 2, pp. 571-579, Feb. 1993.
R. Trebino and D. J. Kane, "Using phase retrieval to measure the intensity and phase of ultrashort pulses: frequency-resolved optical gating," J. Opt. Soc. Am. A 10, 1101-1111 (1993).
C. Iaconis and I. A. Walmsley, "Spectral phase interferometry for direct electric-field reconstruction of ultrashort optical pulses," Opt. Lett. 23, 792-794 (1998).
A. S. Wyatt, I. A. Walmsley, G. Stibenz, and G. Steinmeyer, "Sub-10 fs pulse characterization using spatially encoded arrangement for spectral phase interferometry for direct electric field reconstruction," Opt. Lett. 31, 1914-1916 (2006).
J. R. Birge, Helder M. Crespo, and Franz X. Kartner, "Theory and design of two-dimensional spectral shearing interferometry for few-cycle pulse measurement," J. Opt. Soc. Am. B 27, 1165-1173 (2010).
V. V. Lozovoy, I. Pastirk, and M. Dantus, "Multiphoton intrapulse interference. IV. Ultrashort laser pulse spectral phase characterization and compensation," Optics Letters, vol. 29, pp. 775-777 (2004).
B. Xu, J. M. Gunn, J. M. D. Cruz, V. V. Lozovoy, and M. Dantus, "Quantitative investigation of the multiphoton intrapulse interference phase scan method for simultaneous phase measurement and compensation of femtosecond laser pulses," J. Opt. Soc. Am. B 23(4), 750-759 (2006).
Y. Coello, V. V. Lozovoy, T. C. Gunaratne, B. Xu, I. Borukhovich, C.-H. Tseng, T. Weinacht, and M. Dantus, "Interference without an interferometer: a different approach to measuring, compressing, and shaping ultrashort laser pulses," J. Opt. Soc. Am. B 25(6), A140-A150 (2008).
M. Miranda, C. L. Arnold, Thomas Fordell, F. Silva, B. Alonso, R. Weigand, A. L'Huillier, and H. Crespo, "Characterization of broadband few-cycle laser pulses with the d-scan technique," Opt. Express 20, 18732-18743 (2012).
M. Miranda, T. Fordell, C. Arnold, A. L'Huillier, and H. Crespo, "Simultaneous compression and characterization of ultrashort laser pulses using chirped mirrors and glass wedges," Opt. Express 20, 688-697 (2012).
F. Silva, M. Miranda, B. Alonso, J. Rauschenberger, V. Pervak, and H. Crespo, "Simultaneous compression, characterization and phase stabilization of GW-level 1.4 cycle VIS-NIR femtosecond pulses using a single dispersion-scan setup," Optics express, 22(9), pp. 10181-10191. (2014).
D. Fabris, W. Holgado, F. Silva, T. Witting, J. W. G. Tisch, and H. Crespo, "Single-shot implementation of dispersion-scan for the characterization of ultrashort laser pulses," Opt. Express 23, 32803-32808 (2015).
V. Loriot, G. Gitzinger, and N. Forget, "Self-referenced characterization of femtosecond laser pulses by chirp scan," Optics Express, vol. 21, pp. 24879-24893 (2013).
D. Marquardt, "An algorithm for least-squares estimation of non-linear parameters." Journal of the society for Industrial and Applied Mathematics 11, No. 2: 431-441 (1963).
E. U. Condon, "Immersion of the Fourier transform in a continuous group of functional transformations", Proc. Natl. Acad. Sci. USA 23, 158-164 (1937).
Th. Maiman, "Stimulated optical radiation in ruby," Nature 187, 493-494 (1960).

* cited by examiner

SYSTEM AND METHOD FOR CALCULATING THE SPECTRAL PHASE OF LASER PULSES

CROSS-REFERENCE TO RELATED APPLICATIONS

This application is a U.S. National Stage Application under 35 U.S.C. § 371 of International Patent Application No. PCT/IB2017/054867, filed Aug. 9, 2017, which claims priority to European Application No. 16183901.4, filed Aug. 11, 2016 and Portugal Application No. 109575, filed Aug. 10, 2016, which are hereby incorporated by reference in their respective entireties.

TECHNICAL FIELD

The present disclosure relates to a method and device for the simultaneous compression and characterization of ultrashort laser pulses.

BACKGROUND

The characterization of ultrashort laser pulses is often as important as the generation process itself. Since no methods exist for the direct measurement of such short events, self-referencing techniques are usually employed.

Traditionally, ultrashort pulses have been characterized by nonlinear autocorrelation diagnostics (see, e.g., [1]), which are still widely used in many laboratories. Although relatively simple to implement, these fail to provide complete information (i.e., amplitude and phase) about the pulses. Still, several methods have been devised allowing for the reconstruction of the amplitude and phase of the pulses by combination of autocorrelation and spectral measurements (see, e.g. [2-4]). An important improvement over these techniques came in 1993 with the introduction of frequency resolved optical gating (FROG) [5,6]: by spectrally resolving an autocorrelation (or cross-correlation) signal, a sonogram-like trace is created from which complete characterization of a given pulse can be performed using an iterative algorithm. The quality of the retrieval is reflected by the corresponding FROG error, and the time and frequency marginals of the trace also provide a means to cross-check the results. There are many variants of FROG today, which all rely on spectrally resolving some time-gated signal.

Other methods widely used today are related to the technique of spectral phase interferometry for direct electric-field reconstruction (SPIDER), first introduced in 1998 [7]. These methods do not rely on temporal gating, but instead on interferometry in the spectral domain: the spectrum of a given pulse is made to interfere with a frequency-shifted (sheared) replica of itself, and the resulting spectral interferogram is recorded. Although usually more complicated to set up, retrieving the spectral phase from a SPIDER trace is numerically much simpler than in FROG. Standard SPIDER however is very alignment sensitive and this can easily affect the measured pulse, as there is no straightforward means to determine the quality of the phase measurement. However, recent SPIDER-related methods have been devised that allow overcoming this issue [8,9].

A recent method is Self-Referenced Spectral Interferometry (SRSI), where a reference pulse with a flat spectral phase is collinearly generated from the input pulse by cross-polarized wave generation (XPW) in a nonlinear crystal. The spectral interference pattern resulting from the combination of the input pulse and the reference pulse allows direct retrieval of the spectral phase and intensity. This method however can only measure pulses with durations very close to the Fourier limit, and no more than 2 times this limit. Therefore, SRSI has a very limited tolerance to the input pulse chirp and a small measuring range compared to most other techniques. Furthermore, it can only measure amplified laser pulses, since XPW is a third-order nonlinear process that requires several micro Joules of energy per pulse in order to work.

More recently, a pulse characterization method based on phase scanning, known as multiphoton intrapulse interference phase scan (MIIPS) [10-12], was introduced. It consists in applying purely quadratic phases to the pulse to be characterized and measuring the resulting second-harmonic generation (SHG) signal. By finding which locally introduced amount of group delay dispersion (GDD) results in compression at a given wavelength, an approximation to the GDD of the pulse can be found, thereby allowing for the reconstruction of an approximation of the unknown phase. If a pulse shaper is available in the setup this phase approximation can now be applied to the shaper and the whole procedure repeated. This process takes several iterations of measurements as the phase in each measurement step is approximately calculated.

A related method to this method introduced very recently is called dispersion scan (d-scan) [14-19], which consists on applying well-known spectral phases to the pulse to be characterized around the optimal (or maximum achievable) compression point and measuring the resulting sum-frequency generation (SFG) and second-harmonic generation (SHG) signals. By coupling this measurement with a suitable mathematical model and processing algorithm one is able to fully retrieve the pulse to be measured in a single scan measurement, without the need of approximations, as MIIPS does. This method is highly robust to noise and can even correctly retrieve the phase when there is no SHG signal for a given frequency, as long as there is SFG signal generated by mixing with other parts of the spectrum. Additionally, a dispersion-scan setup doubles as a pulse compressor, which coupled with its measurement capability allows one to optimize the compression of the pulse.

In all of the above techniques, the characterization of laser pulses that are generated by different types of lasers over a broad range of parameters (e.g. from sub-6-fs up to 100-fs) is difficult, and usually requires severe adaptations and physical apparatus modifications in order to be able to measure the several pulses generated using different technologies, e.g. narrowband pulses with hundreds of femtoseconds duration to broadband pulses in the few-cycle domain (<6 fs). Therefore, more than one physical measurement device apparatus to accommodate such broad range of pulse durations is needed.

Additionally, for all the above techniques except d-scan, MIIPS and SRSI, the numerical aperture associated with the experimental arrangements is small as to require a precise and potentially prolonged alignment procedure.

These facts are disclosed in order to illustrate the technical problem addressed by the present disclosure.

GENERAL DESCRIPTION

The present disclosure generally relates to laser systems and laser pulse characterization methods.

We present a flexible technique and device to characterize ultrashort laser pulses over a broad range of parameters. It consists on applying a set of spectral phases to two collinear replicas of the pulse in question and measuring the corresponding spectra after a given nonlinear optical effect. This allows us to fully retrieve the unknown spectral phase of the pulse using numerical iterative algorithms that take advantage of the whole dataset in the spectral and phase domains, making the method very robust with respect to noise sensitivity and bandwidth requirements. Due to the presence of multiplexed signals of different nature in the dataset one can use this technique to measure pulses with very different characteristics such as bandwidth, chirp and pulse duration.

An embodiment of the method comprises generating two collinear replicas of the pulse being characterized; applying two different predetermined spectral phases to each replica, so as to simultaneously scan delay and dispersion; applying a nonlinear process to the pulse to be characterized; measuring the resulting signal from the application of the predetermined spectral phases and nonlinear process; applying a numerical iterative algorithm to the measured signal to retrieve the spectral phase of the pulse to be characterized; such process being done as a scanning procedure or in parallel utilizing a single laser shot.

The two time-delayed replicas may be generated using a birefringent etalon; a controllable amount of dispersion and delay between replicas may be provided by a pair of birefringent wedges, one of them being translated for phase control; dispersion and delay between replicas can also be imparted in parallel by using a single birefringent wedge, which encodes these along a spatial dimension; opposite dispersion to that of the wedges may be introduced by an appropriate optical element, such as chirped mirrors or a dispersive geometric arrangement; the frequency spectrum may be measured as well as the dispersion- and delay-dependent second-harmonic of the signal being phase modulated.

It is disclosed a method for characterizing the spectral phase of laser pulses, the method comprising:
  generating two replicas of each pulse to be characterized;
  applying predetermined nonlinear spectral phases to the two replicas so as to scan a dispersion range by one or both said replicas;
  optically combining the two signals of the preceding step;
  applying a nonlinear optical process to the combined signal of the preceding step;
  for each of the applied spectral phases, measuring the amplitude spectrum of the resulting signal of the preceding step;
  calculating the spectral phase of the pulse to be characterized, from the measured amplitude spectrum, for each of the applied spectral phases, and from the linear spectrum of the pulse to be characterized.

A range comprises the value variation between a lower limit and an upper limit of said values. For example, a dispersion range comprises the dispersion values between a lower limit and an upper limit of dispersion. For example, a delay range comprises the delay values between a lower limit and an upper limit of delay. The lower may be included or excluded in such range. The upper limit may also be included or excluded in such range. In particular, a stepwise range may only include the lower and upper limit value points.

In an embodiment, the predetermined nonlinear spectral phases are applied to the two replicas so as to scan a delay range between the two replicas.

In an embodiment, the predetermined nonlinear spectral phases are applied to the two replicas so as to scan a range of differential dispersion between the two replicas.

The differential dispersion, between the two replicas, obtained by the applied predetermined spectral phases is the difference in dispersion between the two replicas caused by the application of said predetermined spectral phases.

In an embodiment, the linear spectrum of the pulse to be characterized is measured from said pulse.

In an embodiment, calculating the linear spectrum of the pulse to be characterized with the calculation of the spectral phase of the pulse to be characterized.

In an embodiment, optically combining the two signals includes combining coherently the two signals.

In an embodiment, the applied nonlinear optical process, and consequently the measured resulting signal, comprises a nonlinear effect that affects the fundamental spectrum of the pulse, in particular second-harmonic generation, sum-frequency generation, difference-frequency generation, the optical Kerr effect, third-harmonic generation, or combinations thereof.

In an embodiment, calculating the spectral phase of the pulse to be characterized includes calculating a numerical iterative algorithm for iteratively approximating the spectral phase of the pulse to be characterized.

In an embodiment, the numerical iterative algorithm comprises minimizing an error function defined between the measured linear spectrum of the pulse to be characterized and a calculated linear spectrum of the pulse to be characterized, by an iterative approximation of the spectral phase of the pulse to be characterized.

In an embodiment, the numerical iterative algorithm comprises minimizing an error function defined between the highest frequency component along the scan axis of the measured signal and the highest frequency component along the scan axis of the calculated signal, by an iterative approximation of the spectral phase of the pulse to be characterized.

In an embodiment, the numerical iterative algorithm comprises minimizing an error function defined between the second highest frequency component along the scan axis of the measured signal and the second highest frequency component along the scan axis of the calculated signal, by an iterative approximation of the spectral phase of the pulse to be characterized.

In an embodiment, the numerical iterative algorithm comprises minimizing an error function calculated:
  using the property that the integral of the measured signal over dispersion for a given wavelength is independent of the phase of the pulse to be characterized; or
  locally, for each wavelength, with the overall error being a weighted function of all the local errors.

In an embodiment, applying spectral phases so as to perform a scan along a range is performed between a lower limit and an upper limit of said range, continuously along said range or in a stepwise fashion along said range.

In an embodiment, applying spectral phases so as to perform a scan is performed with the duration of the pulses to be characterized reaching a minimum during said scan.

In an embodiment, applying spectral phases so as to perform a scan is performed with said replicas not being synchronized during said scan.

In an embodiment, applying spectral phases so as to perform a scan, applying said nonlinear optical process, and measuring said amplitude spectrum of the resulting signal, are performed in parallel for a plurality of applied spectral phases.

In an embodiment, applying a numerical iterative algorithm comprises defining the function of the spectral phase of the pulse to be characterized as a discrete sampling function, a Taylor expansion function, or a Fourier series function.

In an embodiment, the function of the spectral phase of the pulse to be characterized is represented by the consecutive derivatives of said function with respect to frequency.

An embodiment comprises correcting for a non-flat spectral detection response by:
  simulating a trace for the approximation of the pulse to be characterized at the current iteration;
  comparing the simulated scan marginal to the measured scan marginal in order to calculate the spectral response to be compensated such that the numerical integral of the trace over the dispersion scan parameter, i.e. the frequency marginal, does not
  depend on the original spectral phase of the pulse to be characterized; and
  compensating for the calculated spectral response either by dividing the experimental trace by it or by including it in the retrieval process, by multiplying it by the ideal simulated trace, in each iteration.

An embodiment comprises compensating for a non-flat spectral detection response by minimizing the error function for each wavelength, with the overall error being a weighted function of all these errors.

In an embodiment, the measured second-harmonic generation and sum-frequency generation, SHG/SFG, signal is calculated by:
  applying an inverse Fourier transform to the spectrum of the pulse to be characterized in order to obtain the corresponding electric field in the time domain;
  squaring the time-dependent electric field so as to perform the SHG/SFG calculation; and
  applying a Fourier transform to obtain the SHG/SFG spectrum.

In an embodiment, for the SHG/SFG calculation the spectrum is multiplied by an adequate spectral filter.

In an embodiment, the laser pulses are pulses comprised in a range of 300 cycles to sub-cycle laser pulses.

It is also disclosed a system for characterizing laser pulses comprising:
  a replica generator for generating two replicas of each pulse to be characterized;
  two nonlinear spectral phase shifters for applying predetermined nonlinear spectral phases to the two replicas in order to scan a dispersion range by one or both said replicas;
  an optical adder for combining the two signals from said shifter;
  a nonlinear optical element for applying a nonlinear optical process to the combined signal;
  a sensor for measuring the amplitude spectrum of the resulting nonlinear signal for each of the applied spectral phases;
  an electronic data processor configured to calculate the spectral phase of the pulse to be characterized, from the measured amplitude spectrum, for each of the applied spectral phases, and from the linear spectrum of the pulse to be characterized.

An embodiment comprises a sensor for measuring the linear spectrum of the pulse to be characterized.

An embodiment comprises as a source of predetermined spectral phases: birefringent materials in different thicknesses, birefringent wedges, birefringent prisms, birefringent grisms, or a combination of an optical delay line and one of the following: glass in different thicknesses, wedges, prisms, grisms, diffraction gratings, variable pressure gas cells, and/or optical modulators such as acousto-optic, electro-optic and/or liquid crystal based devices.

In an embodiment, applying predetermined spectral phases so as to scan dispersion independently of delay through: using glass in different thicknesses, wedges, prisms, grisms, diffraction gratings, variable pressure gas cells, and/or optical modulators such as acousto-optic, electro-optic and/or liquid crystal based devices.

In an embodiment, the nonlinear spectral phase shifter is a laser compressor.

In an embodiment, the laser compressor comprises chirped mirrors and glass wedges.

In an embodiment, the sensor comprises a spectrometer or a sensor based on CCD cameras, or a sensor based on CMOS camera for measuring the spectrum of the pulses to be characterized.

In an embodiment, the nonlinear process comprises second-harmonic generation, sum-frequency generation, difference-frequency generation, the optical Kerr effect and related nonlinear phase modulation effects, and/or third-harmonic generation, and the nonlinear optical element comprises gases, solids, liquids or plasmas.

An embodiment comprises means to execute in parallel said impartment of spectral phases, nonlinear conversion and measurement of the resulting signal.

BRIEF DESCRIPTION OF THE DRAWINGS

The following figures provide preferred embodiments for illustrating the description and should not be seen as limiting the scope of invention.

DETAILED DESCRIPTION

Figure 1:
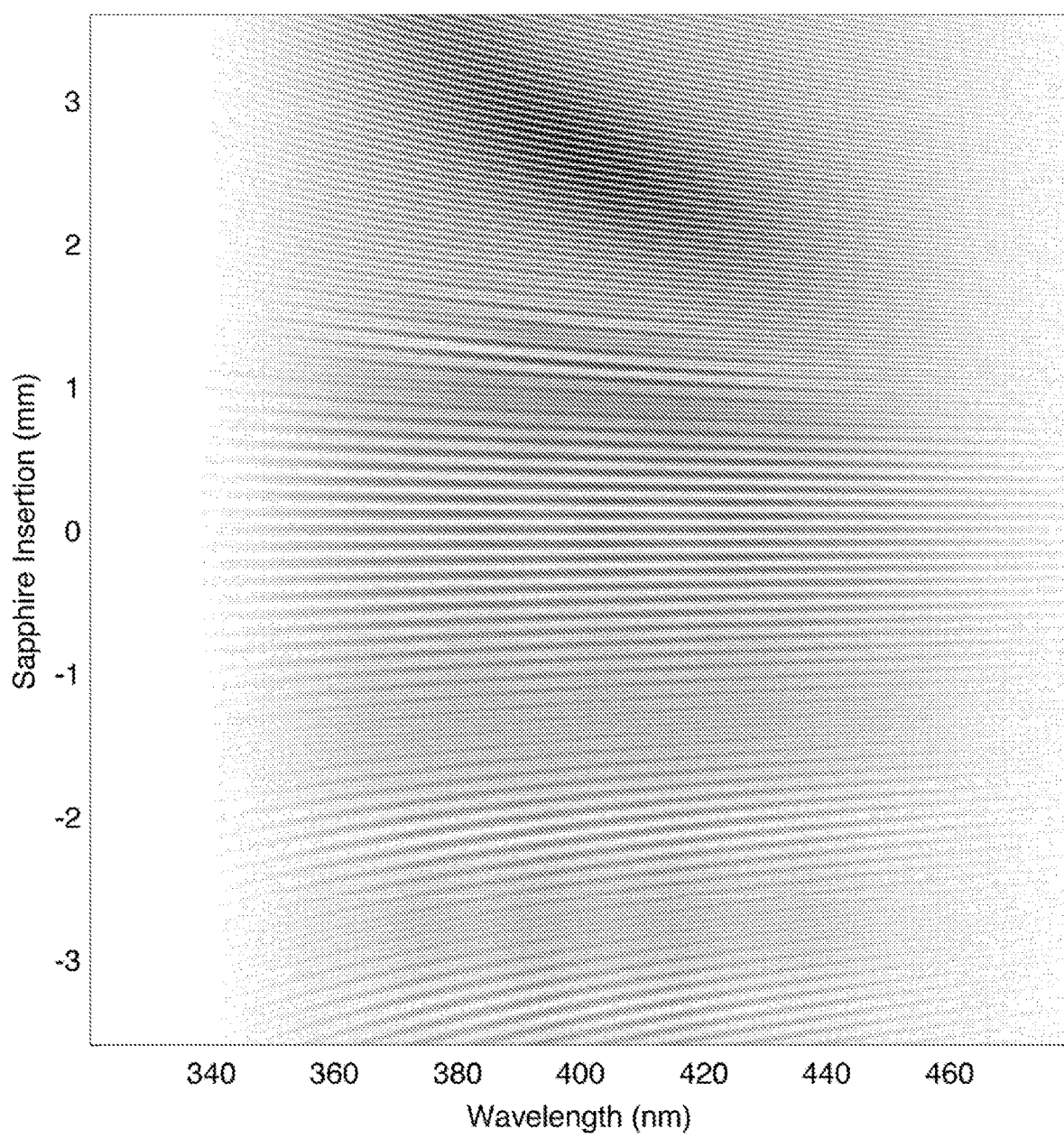
FIG. 1: Calculated gd-scan trace for the simple implementation described in the text, for a pulse with spectrum from 700 to 1000 nm and −300 fs^2 and 100 fs^3 of phase, as well as a small superimposed oscillating phase.

The present disclosure relates to a method and device for the simultaneous compression and characterization of ultrashort laser pulses.

Our method is especially suited to measure ultrashort pulses with diverse bandwidths and durations without changes to the apparatus or acquisition parameters. To do this, a pair of replicas of the pulse to be measured are independently dispersed and delayed in time and further frequency converted using a nonlinear process. By frequency resolving the generated nonlinear signal for various sets of parameters one is able to determine the intensity and phase of the pulse through an adequate mathematical model and algorithm.

This technique is related to the d-scan technique [14-19] in the sense that the pulse to be measured suffers progressive dispersion and a nonlinear signal is measured as a function of this parameter. In fact, when the birefringent material presents very similar dispersion profiles in both optical axes, a signal similar to the d-scan signal is encoded in a certain fringe pattern of the signal measured in this technique (which is not the general case). However, the present method distinguishes itself by providing several functionalities not present in the d-scan technique, namely by multiplexing several signals of different nature into the same measured dataset—dispersion-based signals reminiscent to dispersion scans, time-gated signals reminiscent of frequency resolved autocorrelations and signals which potentially encode the group delay dispersion of the pulse to be measured into a 2D fringe position, reminiscent of 2D SPIDER traces. Due to these multiple signals one is able to measure the pulse even when the range of the dispersion scan is not sufficient to compress the pulse, i.e. to undergo optimum compression (unlike the d-scan technique). Another way the present method distinguishes itself from the d-scan technique is in terms of the applied data processing models, which has to model a more intricate interaction between the two dispersion-delay-scanned replicas.

Owing to the variable delay imparted between the two replicas and subsequent nonlinear conversion, the present technique is tangentially related to autocorrelation techniques or even FROG [5] as the temporally-gated signal can be thought as a frequency resolved correlation. However, the present technique distinguishes itself from autocorrelations and FROG simply from the fact that the pulse to be measured is being modified during the measurement, by introducing dispersion, hence none of the formalisms and assumptions that autocorrelations and FROG are based on are valid, as they require a constant temporal intensity profile for each replica all throughout the measurement.

We now present a description of the principles and characteristics of embodiments of the method and system.

Consider an ultrashort laser pulse, which can be described by its complex spectral amplitude:

$$U(\omega)=|U(\omega)|\exp\{i\phi(\omega)\} \quad (1)$$

The pulse is then divided into two replicas through either geometric, birefringent or electro-optic processes, which in general will yield the two following pulses:

$$U1(\omega)=|U(\omega)|\exp\{i\phi(\omega)+i\psi1(\omega)\} \quad (2)$$

$$U2(\omega)=|U(\omega)|\exp\{i\phi(\omega)+i\psi2(\omega)\} \quad (3)$$

Where $\psi1$(omega) and $\psi2$(omega) are the phase imparted by the replica creation process, containing both dispersion and delay contributions.

The 2 replicas, that can be collinear or not, are subject to a set of independent spectral phases and then some nonlinear process. For the simple case where the 2 replicas are collinear and perpendicularly polarized, and the different spectral phases are imparted due to propagation through a piece of birefringent material with the optical axis aligned along the axis of replica U1, furthermore both replicas being projected into the same polarization using a polarizer, and the nonlinear process is second harmonic generation, the measured SHG spectral power as a function of birefringent material thickness is proportional to $S(\omega,z)$, defined as:

$$U1'(\omega,z)=U1(\omega)\exp\{izk\_e(\Omega)\} \quad (4)$$

$$U2'(\omega,z)=U2(\omega)\exp\{izk\_o(\Omega)\} \quad (5)$$

$$S(\omega,z)=|\int(\int(U1'(\Omega,z)+U2'(\Omega,z))\exp(i\Omega t)d\Omega)^2\exp(-i\omega t)dt|^2 \quad (6)$$

where z is the thickness of the birefringent material, $k\_e(\Omega)$ the corresponding frequency-dependent phase per unit length (or wavenumber) acquired by the pulse propagating with polarization aligned with the optical axis of the birefringent material and $k\_o(\Omega)$ the corresponding frequency-dependent phase per unit length (or wavenumber) acquired by the pulse propagating with polarization aligned perpendicularly to the optical axis of the birefringent material.

In expression (6), we take the sum of the propagated replicas defined in (4) and (5) in the spectral domain and Fourier transform them to have the electric field in the time domain. Then SHG is performed (the time-dependent field is squared), and an inverse Fourier transform gives us the SHG spectrum.

We perform a scan, which we will call generalized dispersion scan from now on, or gd-scan for short, on the unknown pulse by introducing different thicknesses of birefringent material and measuring the corresponding SHG spectra, which results in a two-dimensional trace. Note that the usage of a birefringent material is presented only as an example implementation: any other device capable of imposing an independent spectral phase containing both dispersion as well as delay in each of the pulse replicas could also be used, including two successive arrangements, one introducing gradual dispersion (e.g. obtained with prisms, grisms, diffraction gratings, variable pressure gas cells and optical modulators such as acousto-optic, electro-optic and liquid crystal based devices) and the other variable delay (e.g. obtained with an interferometric delay line). In this last case one can choose an appropriate ratio between the dispersion and delay imparted in order to measure a two dimensional trace, or acquire instead a three dimensional data set.

This model assumes that the SHG process consists simply on squaring the electric field in time, which assumes an instantaneous and wavelength-independent nonlinearity. We will discuss the consequences of this approximation later. For simplicity, we will also use negative values for the birefringent material insertion. While this is obviously unrealistic from an experimental point of view, mathematically it simply results from setting a given reference insertion as zero. Regardless of this definition, if we know the electric field for a given insertion, we will be able to calculate it for any other insertion.

As an example, we show in FIG. 1 a calculated gd-scan trace of an input pulse with spectrum from 700 to 1000 nm and −300 fs^2 and 100 fs^3 of phase, as well as a small superimposed oscillating phase.

The assumed birefringent material is sapphire, and the corresponding phase was calculated from well-known, precise and easily available Sellmeier equations. The first obvious feature of the trace is its interferometric nature: since the two pulse replicas are collinear and interferometrically delayed between each other, constructive and destructive interference happens with a half-cycle period, hence the vertical modulation. It is this interferometric nature of the gd-scan trace that allows multiplexing of signals of different natures in the same measured dataset.

Figure 2:
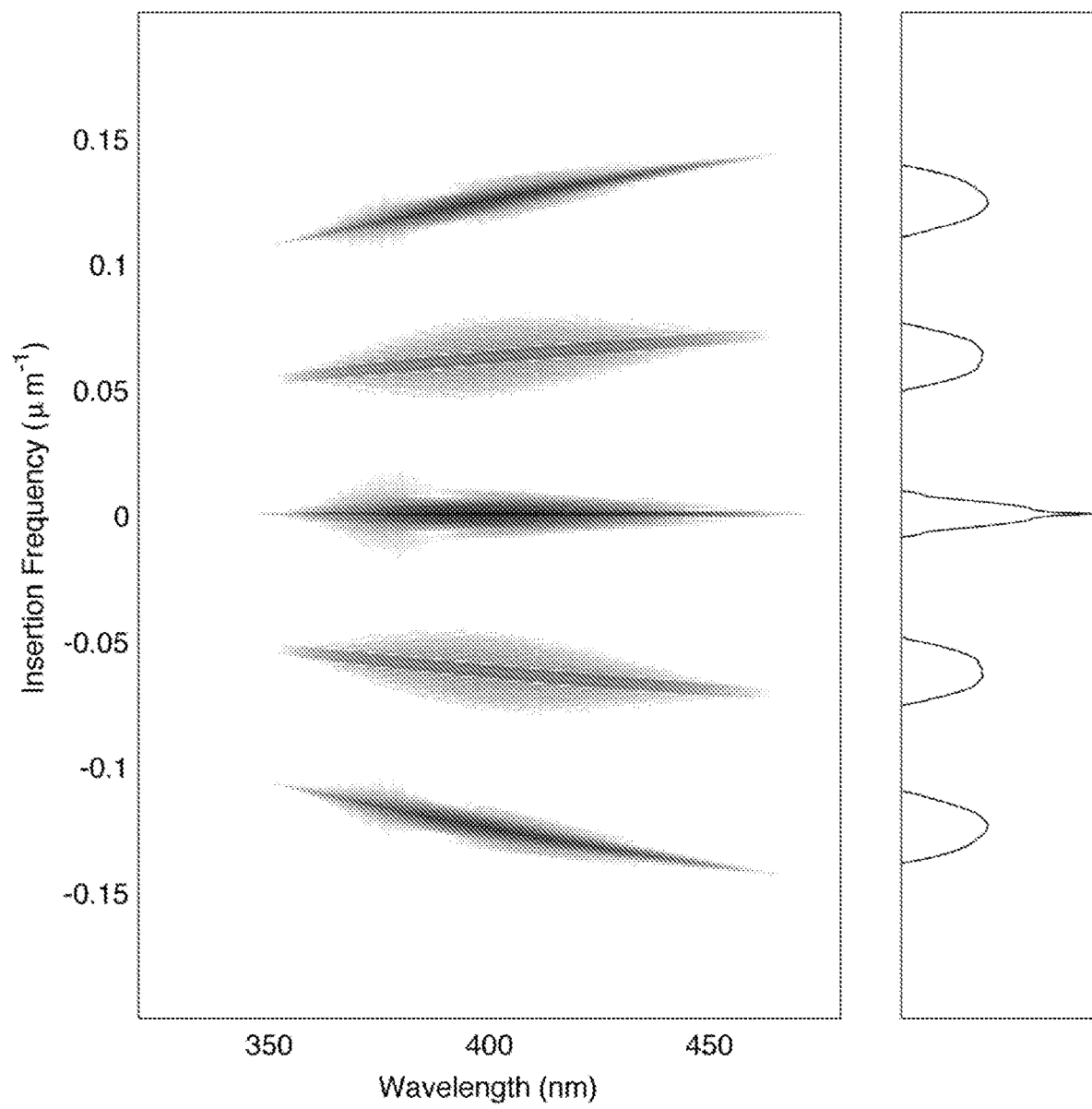
FIG. 2: Left: Fourier transform of the gd-scan trace in FIG. 1, along the insertion axis. Right: Wavelength marginal of signal on the left.

Using Fourier analysis, one can untangle the different multiplexed signals. By Fourier transforming the signal along the insertion axis, one can obtain 5 different peaks, i.e. signals oscillating at different insertion frequencies (FIG. 2). Let us call the signal around 0 um^-1 the DC signal, the signal oscillating at the highest insertion frequency the 2omega signal and the intermediate signal the omega signal (we ignore the signals at negative frequencies). By isolating the peaks corresponding to these signals with e.g. super-gaussian filter functions and Fourier transforming them back into the insertion domain one can then analyse them separately.

Figure 3:
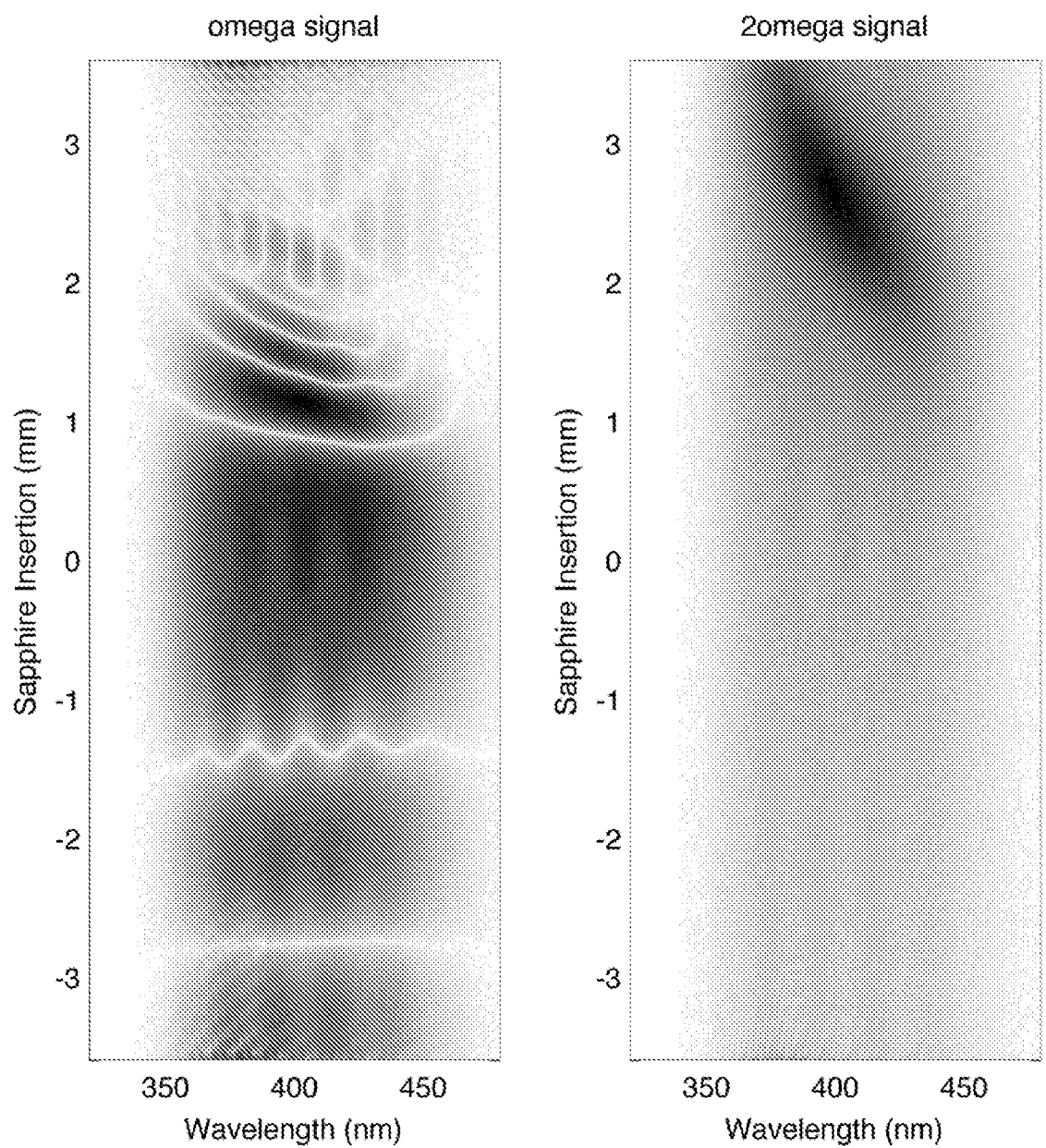
FIG. 3: Left: Omega signal corresponding to the gd-scan in FIG. 1. Right: 2-omega signal corresponding to the gd-scan in FIG. 1.

From a pulse retrieval point of view, the most important data is encoded in the signals at omega and at 2omega (FIG. 3). The 2omega signal is the average between the d-scan traces from both replicas. The omega signal is time-gated, i.e. its extension in the insertion direction is closely related to the pulse duration. Interestingly, for a pulse with a non-flat phase, this signal displays a series of vertical fringes, where the group delay dispersion of the pulse is encoded. The combination between these three signals (d-scan, time-gated, gdd-fringes) enables retrieval of the electric field over a broad range of parameters, namely: when the pulse does not undergo a maximum compression point over the full scan; when the pulse to be measured is longer than the maximum intra-replica delay, due to chirp; when the apparatus does not scan the delay of the pulses from negative to positive, but scans exclusively negative delays or positive delays; or when the replicas are never negatively chirped.

Of interest is the regime where the pulse to be measured is scanned over the positive-delay, positive-dispersion range (negative-delay, negative dispersion in regions where the wedge material is anomalous), as it greatly simplifies the replica production process, as no negative delays nor negative dispersion needs to be introduced (positive-delay, positive dispersion in regions where the wedge material is anomalous). In this regime the measured signal contains enough information to fully retrieve the pulse, even though the pulse does not undergo maximum compression, as forcibly necessary in the d-scan technique [14], or the replicas are never synchronized in time. This is due to the redundancy displayed in the observed nonlinear interference patterns.

Note that the current description is not limited to multi-shot arrangements: similarly to single-shot dispersion scan [18], by encoding the insertion axis in one spatial direction and reimaging the plane where such variation was encoded into the surface of a nonlinear crystal, and further analysing the resulting spatially varying nonlinear signal with a multichannel spectrometer capable of resolving such spatial variation (e.g. an imaging spectrometer), one is able to measure a given scan in one single acquisition, possibly containing only a single laser shot.

The question now arises on how to find the electric field that generates a given scan. Using the model in equations (1-6), coupled with the filtering process described in the last paragraph, we are able to simulate the measured scans for a given electric field. By employing an algorithm capable of determining the electric field that generates a simulated trace identical to the measured one (regarding either the omega or 2-omega traces; or considering both simultaneously by fitting the actual measured signal without frequency filtering) one reconstructs the electric field of the pulse to be measured (apart from a constant phase, also known as the carrier-envelope phase), in both the spectral and temporal domains. In the spectral domain the pulse is defined by the spectral intensity and phase, being the spectral intensity straightforward to measure. Hence, although it is possible to determine both the spectral intensity and phase from this procedure, it is beneficial to supplement the gd-scan measurement with a measurement of the spectral intensity, which introduces redundancy to the dataset and makes this procedure less prone to errors, as now only the spectral phase needs to be determined.

The algorithm employed for the determination of the electric field from the given dataset (which may or might not include the spectral intensity) can be based on several different methods, including nonlinear optimization algorithms, genetic algorithms, machine learning, neural networks, stochastic methods, estimation of distribution algorithms, general projections, or any algorithm capable of fitting a simulated dataset to a measured dataset given a set of independent variables (in this case the spectral phase of the input pulse, (1)(w)). As an example, we used the Broyden-Fletcher-Goldfarb-Shanno (BFGS) algorithm, a quasi-Newton nonlinear, unbounded optimization method. Essential to the usage of such algorithms is to define a fitness, or merit, metric to compare measured and simulated datasets. We use metrics similar to those used in the d-scan method [14]. This merit function can be either zero- or one-dimensional, and defined respectively by:

$$G\_0D = \sqrt{1/(N_i N_j) \Sigma_{i,j}(S\text{meas}(\omega_i, z_j) - \mu S\text{sim}(\omega_i, z_j))^2} \quad (7)$$

$$G\_1D(\omega) = \sqrt{1/(N_j) \Sigma_j(S\text{meas}(\omega, z_j) - \mu S\text{sim}(\omega, z_j))^2} \quad (8)$$

Where Smeas and Ssim refer to the measured and simulated scans (either the filtered omega or 2omega signals; or the full interferometric measured signal), Ni and Nj are the number of points in the frequency and dispersion axes, respectively, and μi is the factor that minimizes the error for each frequency component ωi and is given by:

$$\mu i = \Sigma_j S\text{meas}(\omega_i, z_j) S\text{sim}(\omega_i, z_j) / S\text{sim}(\omega_i, z_j)^2 \quad (9)$$

Algorithms such as the BFGS operate on minimizing a zero-dimensional merit function (7), but for example algorithms such as the Levenberg-Marquardt algorithm (LMA) [20] are apt to minimize one-dimensional merit functions (8) which can have convergence benefits for certain datasets.

To make convergence easier for the algorithm and improve convergence conditions, the phase function should be described in a convenient basis. As commonly required, we want to minimize the number of dimensions in the problem while still accurately describing the phase, and we want a basis whose functions are as uncoupled as possible, to prevent the algorithm from getting stuck on local minima. Different approaches can be taken here.

Some authors choose to allow each point of the sampled complex spectral or time phase to be an independent variable (e.g. [2]), and as such, the number of dimensions of the problem will be determined by the sampling. Another, very common, choice is to use a Taylor expansion as a basis.

In the former case, the large number of parameters makes the algorithm rather slow, while in the latter there is a high degree of coupling between the even terms (i.e., second order dispersion, fourth order dispersion, etc.) as well as between the odd terms (third order dispersion, fifth order dispersion, etc.).

This base would still be a good choice, if not optimal, for simple phase functions, such as the ones introduced by glasses, gratings, prism compressors, etc., which are accurately described in such a way.

In our example case, we may choose to either write the phase as a Fourier series or as a sparse point-by-point representation in wavelength or frequency space with bicubic interpolation between points. We find that either approach converges as long as the numerical algorithm is sufficiently apt and the representation grids are suitable for the problem (not too sparse). In spite of this, any other phase base or approach can be suitable, including using the first or second derivatives of the phase in respect to frequency as the independent variables; including the fitting of not only the spectral phase but also the spectral intensity; using the temporal intensity and phase as independent variables; using the fractional Fourier transform [21] or another kind of linear canonical transform instead of the Fourier transform to describe the problem in fractional time-frequency space.

The described method is not limited to using SHG: any other optical nonlinearity, such as sum-frequency generation, difference-frequency generation, the optical Kerr effect (and related nonlinear phase modulation effects), and third-harmonic generation, taking place in gases, solids, liquids or plasmas, and in fact any nonlinear effect that changes/affects the fundamental spectrum, can in principle be used with this method. The set of applied spectral phases can also be arbitrary as long as they affect the electric field temporally and consequently the generated nonlinear spectra.

Figure 4:
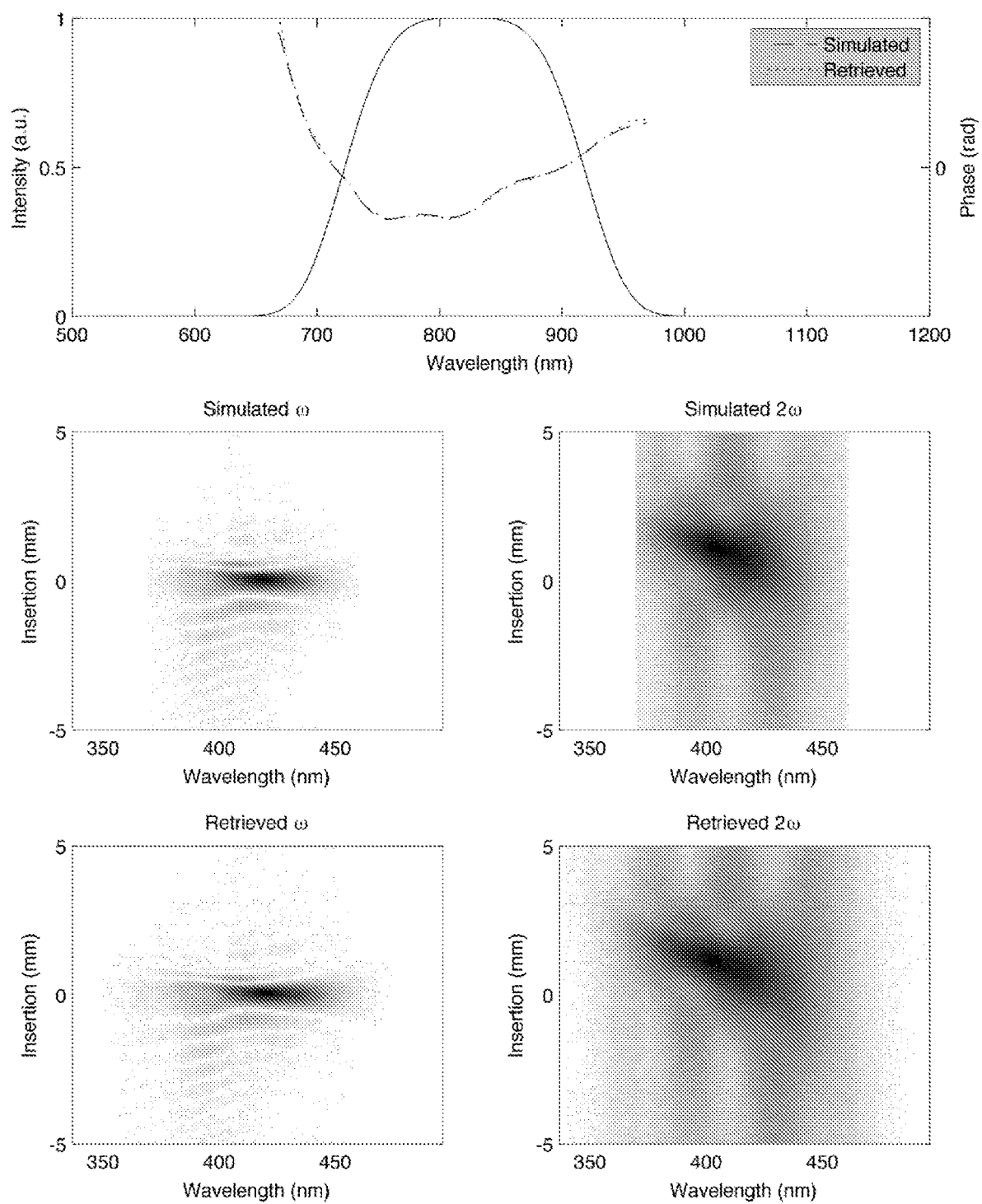
FIG. 4: Example retrieval of a theoretical gd-scan trace. Top row: simulated spectral intensity (solid line) and phase (dashed line). Retrieved spectral phase (dotted line). Middle row: Omega and 2omega signals corresponding to the simulated pulse. Bottom row: Retrieved Omega and 2omega signals.

FIG. 4 shows an example of a simulated spectrum (measured power spectrum and simulated phase), its SHG gd-scan, and the corresponding retrieved phase. The agreement between the retrieved and original phases is very good typically down to regions where the spectral power is around 2% of the peak spectral power.

The simulated gd-scan was artificially limited in wavelength by simulating a SHG process with a limited bandwidth or a limited spectral transmission from optics present in the setup, leading to an attenuated and even zero signal at several wavelengths (shorter than 370 nm and longer than 460 nm)—a common experimental issue. In spite of this, it is possible to correctly retrieve the phase for a certain frequency, even if there is no signal at the corresponding SHG (doubled) frequency as can be seen from the result in FIG. 4—the phase is nevertheless correctly retrieved across the whole spectrum. This would not be possible with the MIIPS, chirp-scan or other retrieval techniques.

Figure 5:
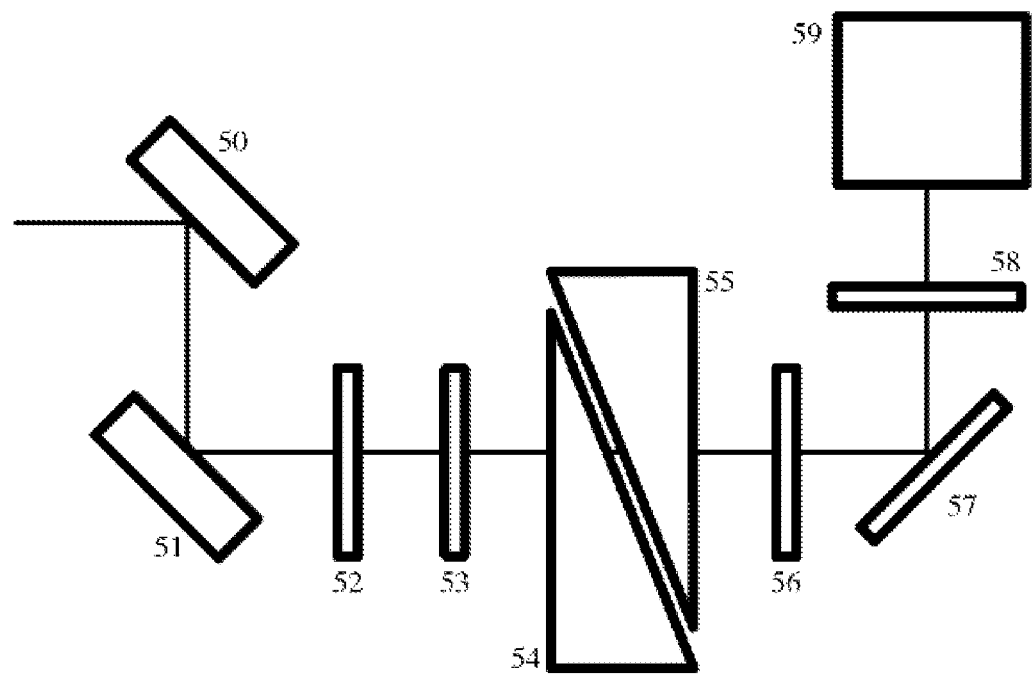
FIG. 5: Simplified diagram of a possible experimental implementation, where dispersion and delay are introduced using a pair of birefringent wedges.

A simplified diagram of a possible experimental implementation is given in FIG. 5, where dispersion and delay are both introduced within the same optical element. The source of ultrafast pulses to measure and compress was an ultrafast laser oscillator (Enora by Sphere Photonics, not shown), wherein such pulses have p-polarization. The replica production with adequate phase for measurement is done by the next three elements: a pair of chirped mirrors (50,51) imparts negative dispersion ($-fs^2$) in the pulse, a half-wave plate rotates the polarization of the input pulse (52) and is followed by a calcite plate (53) with the optical axis parallel to the table, which will delay both vertical and horizontal polarizations differently. The replica production stage is followed by a pair of Quartz wedges (54, 55), one of which is on a moveable stage as to introduce variable delay and dispersion. Subsequently a polarizer (56) projects both variably delayed and dispersed replicas in the same polarization plane between p and s-pol, and then the SFG/SHG signal is generated by focusing the resulting beam with an off-axis aluminum-coated parabola (57) on a standard non-linear crystal (58). A spectrometer (59) then records the resulting signal. This setup can be transformed into a variable compressor just by rotating the half-wave plate as not to rotate the input polarization and rotating the polarizer to fully transmit the p-polarization, and the pulse deviated to e.g. an experiment instead of being sent to the SFG/SHG stage. Hence one can not only measure the pulse but also optimize it (within the range of the compressor, which is design dependent). Such setup can also be used as a standalone pulse measurement device, provided that a calibration of the system dispersion from the entrance of the system to the SHG crystal is subtracted. Such measurements are routinely done using several techniques, e.g. white-light interferometry.

Figure 6:
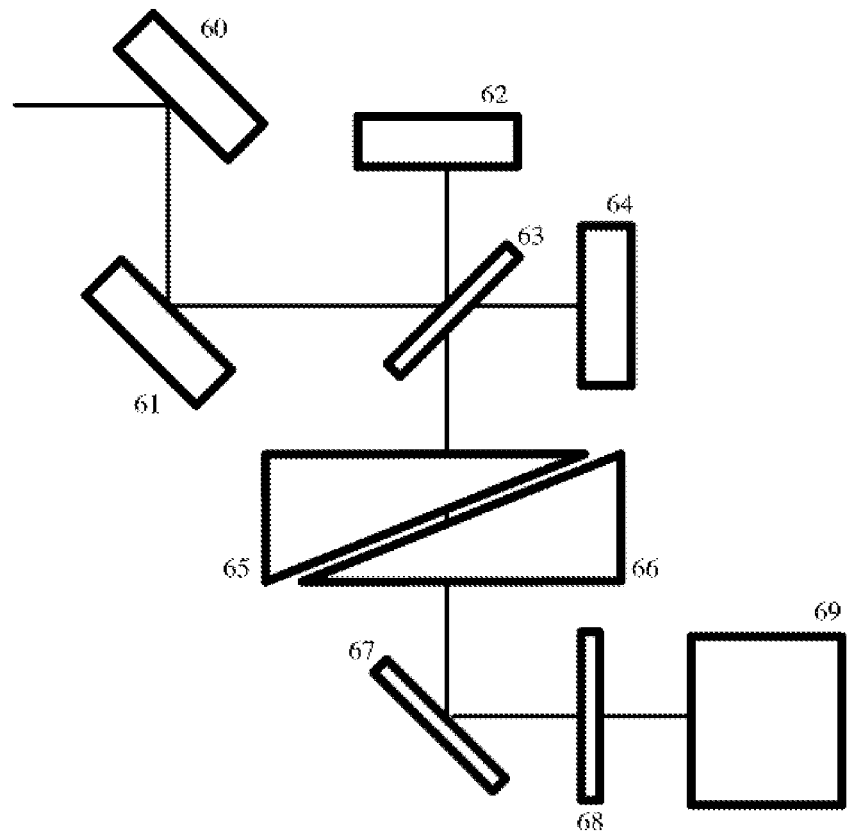
FIG. 6: Simplified diagram of a possible experimental implementation, where dispersion is introduced using any kind of wedges and delay is introduced using a Michelson interferometer.

A simplified diagram of a second possible experimental implementation is given in FIG. 6, where dispersion and delay are introduced with different optical elements. The source of ultrafast pulses to measure and compress was an ultrafast laser oscillator (Enora by Sphere Photonics, not shown), wherein such pulses have p-polarization. The replica production with adequate phase for measurement is done by the next two elements: a pair of chirped mirrors (60,61) imparts negative dispersion (-fs2) in the pulse, and a Michelson interferometer (62, 63, 64) creates the two replicas with variable delay. The replica production stage is followed by a pair of BK7 glass wedges (65, 66), one of which is on a moveable stage as to introduce variable dispersion. Subsequently the SFG/SHG signal is generated by focusing the resulting beam with an off-axis aluminum-coated parabola (67) on a standard nonlinear crystal (68). A spectrometer (69) then records the resulting signal. This setup can be in principle be transformed into a variable compressor by setting the delay in the Michelson interferometer to zero and the pulse deviated to e.g. an experiment instead of being sent to the SFG/SHG stage. Hence one can not only measure the pulse but also optimize it (within the range of the compressor, which is design dependent). Such setup can also be used as a standalone pulse measurement device, provided that a calibration of the system dispersion from the entrance of the system to the SHG crystal is subtracted. Such measurements are routinely done using several techniques, e.g. white-light interferometry.

Figure 7:
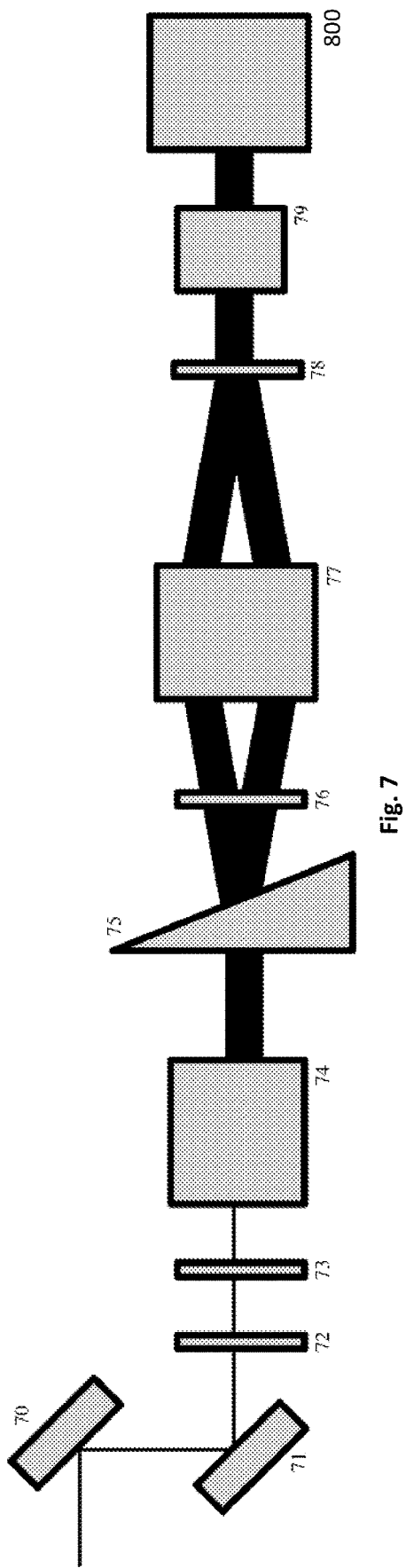
FIG. 7: Simplified diagram of a possible experimental implementation, where dispersion and delay are encoded in one spatial dimension using a birefringent wedge and the measurement of the whole trace can be done with a single laser shot.

A simplified diagram of a third possible experimental implementation is given in FIG. 7, where dispersion and delay are introduced with the same optical element and the measurement is done with a single laser shot.

The source of ultrafast pulses to measure was an ultrafast laser oscillator (Enora by Sphere Photonics, not shown), wherein such pulses have p-polarization.

The replica production with adequate phase for measurement is done by the next three elements: a pair of chirped mirrors (70, 71) imparts negative dispersion ($-fs^2$) in the pulse, a half-wave plate (72) rotates the polarization of the input pulse and is followed by a calcite plate (73) with the optical axis parallel to the table, which will delay both vertical and horizontal polarizations differently.

A telescope (74) increases beam size significantly, which will then propagate through a wedge (75) with the optical axis perpendicular to the optical table, creating a spatially variable dispersion and delay between replicas across the beam.

Subsequently a polarizer (76) projects both variably delayed and dispersed replicas in the same polarization plane at 45 degrees between p and s-pol, and an optical system (77) creates a demagnified image of the beam at the entrance plane of the wedge on the nonlinear crystal (78). An optical system (79) reimages the SHG/SFG crystal plane into the entrance slit (800) of an imaging spectrometer, which is able to record the full trace in one single exposure, possibly corresponding to a single laser pulse. Such setup can be used as a pulse measurement device, provided that a calibration of the system dispersion from the entrance of the system to the SHG crystal is subtracted. Such calibration measurements are routinely done using several techniques, e.g. white-light interferometry.

Figure 8:
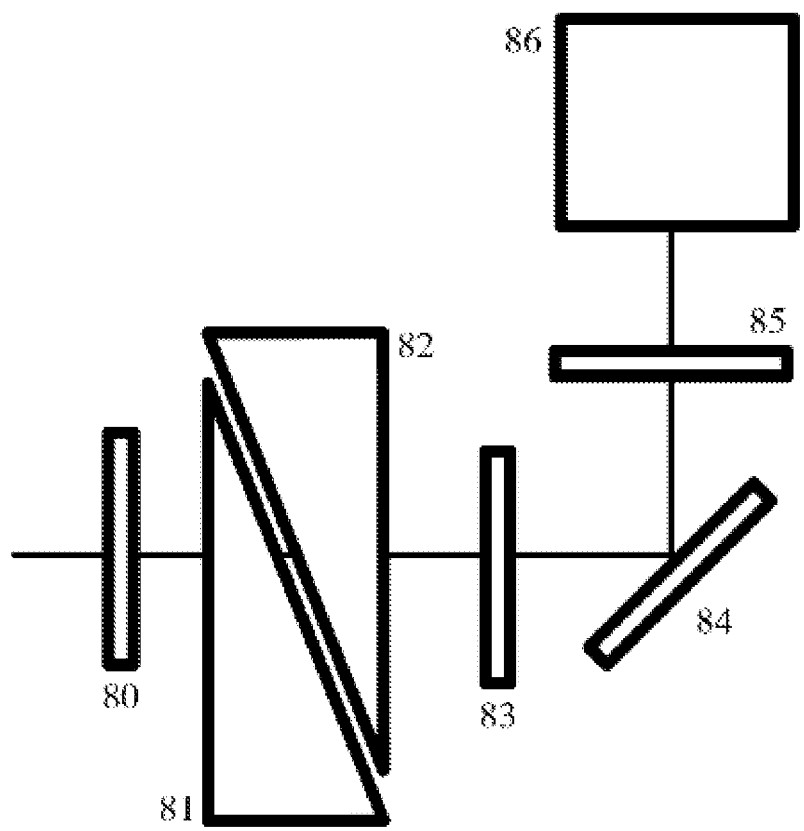
FIG. 8: Simplified diagram of a possible experimental implementation, where dispersion and delay are introduced using birefringent wedges and negative dispersion is not imparted on the pulse.

A simplified diagram of a fourth possible experimental implementation is given in FIG. 8, where dispersion and delay are both introduced within the same optical element, without the necessity for the generated replicas to have negative chirp (in case the wedges introduce normal dispersion; positive in case said wedges introduce anomalous dispersion) or the scan to undergo zero delay. The source of ultrafast pulses to measure and compress was an ultrafast laser oscillator (Enora by Sphere Photonics, not shown), wherein such pulses have p-polarization. A half-wave plate (80) rotates the polarization of the input pulse and the resulting pulse is propagated through a pair of Quartz wedges (81, 82), one of which is on a moveable stage as to vary the propagation length inside the wedges. The projection of the input pulse along the optical axis' polarization will be dispersed and delayed with different amounts than the projection in the polarization perpendicular to the optical axis, effectively both creating the two necessary replicas and introducing the necessary spectral phases in each of them. Subsequently a polarizer (83) projects both variably delayed and dispersed replicas in the same polarization plane between p and s-pol, and then the SFG/SHG signal is generated by focusing the resulting beam with an off-axis parabola (84) on a standard nonlinear crystal (85). A spectrometer (86) then records the resulting signal. Such setup can be used as a standalone pulse measurement device, provided that a calibration of the system dispersion from the entrance of the system to the SHG crystal is subtracted. Such calibration measurements are routinely done using several techniques, e.g. white-light interferometry.

Figure 9:
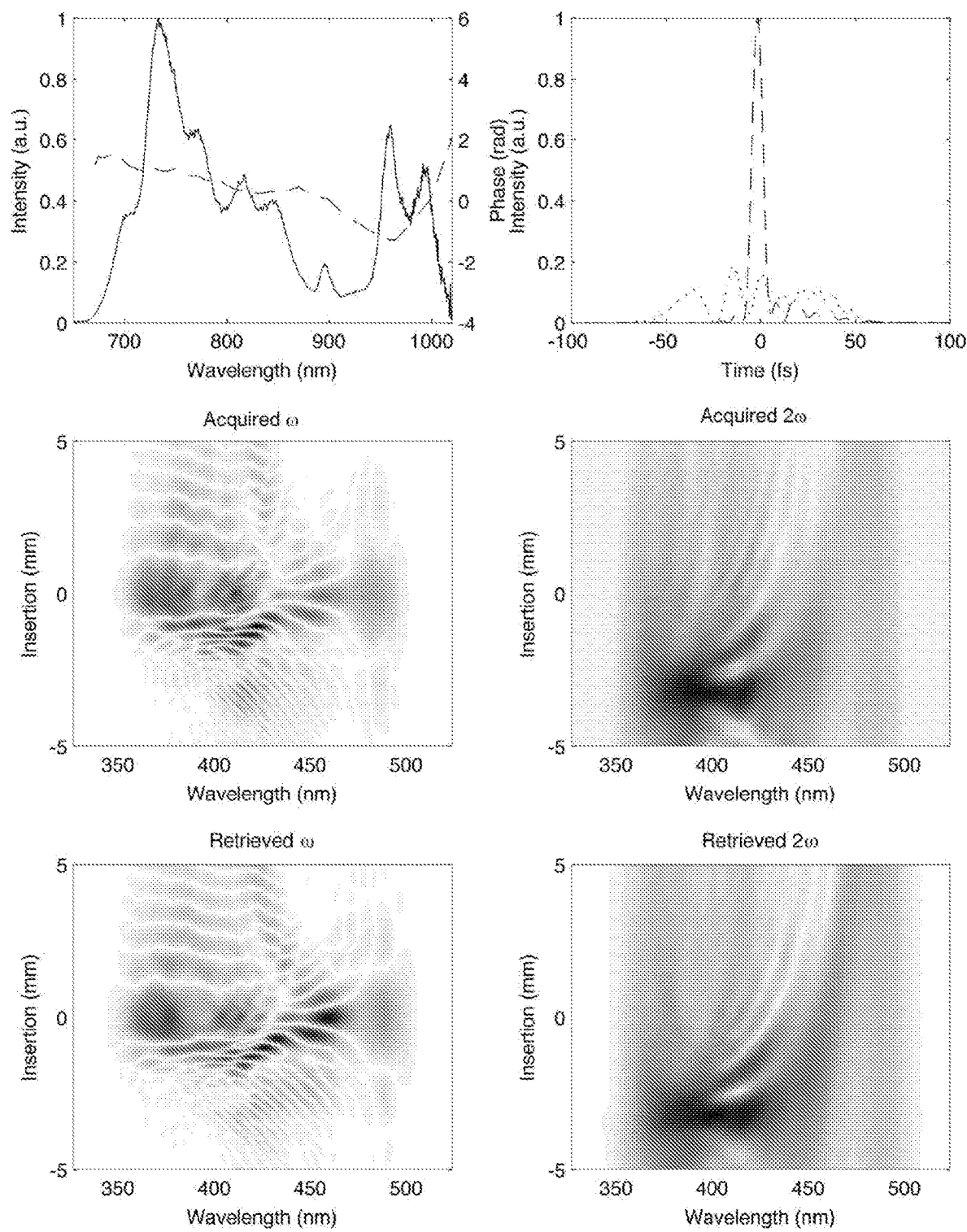
FIG. 9: Measurement and Retrieval of an experimental pulse. Top left: Measured spectral intensity and retrieved spectral phase. Top Right: Retrieved temporal intensity of the pulse at the insertion 0 (dotted line, 79 fs FWHM) and at the optimum insertion (dashed line, 6.6 fs).

Using the setup from FIG. 5, a generalized dispersion scan was performed with fine sampling in thickness (2048 acquired spectra, with a thickness step of about 9 µm), and is represented in FIG. 9, along with the filtering of the omega and 2omega signals. Because of the angle of the wedges, this thickness step corresponds to a wedge translation step of 10 µm so the positioning precision is undemanding compared to interferometric methods. A different wedge design would allow a further decrease in positioning precision, i.e. one can design the apparatus to function with different kinds of positioning technologies.

The measured pulse was retrieved using the algorithms described earlier and the results represented in FIG. 9. The "zero" insertion here refers to the insertion at which the pulse is shortest, and for which the phase and time reconstructions are shown. The retrieved pulse width at insertion zero was 79 fs, albeit with a spectrum supporting 6.0 fs. From the retrieved data it is straightforward to determine that at the wedge position where the insertion corresponds to −3.0 mm the pulse is shorter, corresponding to 6.6 fs Note that there is no time-direction ambiguity on the retrieved pulse. Even if the laser source and setup as it is don't allow for any shorter pulses, the precise phase measurement actually allows one to re-design the compressor if necessary, i.e. by using different glasses and/or chirped mirrors.

It is worth noting that the phase retrieval is very robust even in regions of very low spectral power density. And, considering there is very little SHG signal above 500 nm and below 350 nm, it is surprising at first that the phase is consistently retrieved well beyond 1000 nm and below 700 nm. Again, this is due to the coupling between all the frequency components on the trace and the original spectrum giving data redundancy in the dispersion scan SHG trace, one of the key aspects of this technique.

The phase retrieval technique used in this demonstration of the technique is certainly not the only possible one. Even if it worked extremely well for our purposes, better, faster and more elegant numerical approaches are certainly possible and will be studied in future work.

After having the field well characterized for a given insertion it is straightforward to calculate it for any other insertion by applying the known phase curve of the glass to the retrieved phase. One can then simply rotate the lambda/2 to not change the polarization, and find the insertion that minimized the pulse length and move the wedges into the corresponding position, which results in optimum pulse compression of the pulse on target.

We have described and demonstrated a simple, inexpensive and robust method to characterize ultrashort laser pulses based on iterative phase retrieval from dispersion scans, using chirped mirrors, wedges and a standard SHG crystal. For the shown implementation, the alignment is very easy (no interferometric precision or stability are needed). Also, we are not as limited by the phase-matching restrictions of the SHG crystal as with other techniques, which allows for the characterization of extremely broad bandwidth pulses without having to sacrifice SHG efficiency by employing unpractically thin crystals. As a result, we were able to obtain a simple, efficient and robust device capable of successfully measuring ultrashort light pulses from the few-cycle regime to >100 fs with the same setup and acquisition settings. This new pulse measuring technique and device should be important to anyone that uses femtosecond laser pulses both in scientific research and in real-world uses, from medical to industrial applications.

The term "comprising" whenever used in this document is intended to indicate the presence of stated features, integers, steps, components, but not to preclude the presence or addition of one or more other features, integers, steps, components or groups thereof.

Flow or optical diagrams of particular embodiments of the presently disclosed methods are depicted in figures. The diagrams do not depict any particular means, rather the diagrams illustrate the functional information one of ordinary skill in the art requires to perform said methods required in accordance with the present disclosure.

It will be appreciated by those of ordinary skill in the art that unless otherwise indicated herein, the particular sequence of steps described is illustrative only and can be varied without departing from the disclosure. Thus, unless otherwise stated, the steps described are so unordered meaning that, when possible, the steps can be performed in any convenient or desirable order such that the same result.

The disclosure should not be seen in any way restricted to the embodiments described and a person with ordinary skill in the art will foresee many possibilities to modifications thereof.

The above described embodiments are combinable.

The following claims further set out particular embodiments of the disclosure.

The following references, should be considered herewith incorporated in their entirety:

[1] J. A. Armstrong, "Measurement of picosecond laser pulse widths", Appl. Phys. Lett. 10 (1), 16 (1967);
[2] K. Naganuma.; K. Mogi; Yamada, "General method for ultrashort light pulse chirp measurement," Quantum Electronics, IEEE Journal of, vol. 25, no. 6, 1225-1233, (1989).
[3] A. Baltuska, Z. Wei, M. S. Pshenichnikov, D. A. Wiersma, and R. Szipocs, "All-solid-state cavity-dumped sub-5-fs laser," Appl. Phys. B 65, 175-188 (1997)
[4] J. W. Nicholson, J. Jasapara, W. Rudolph, F. G. Omenetto, and A. J. Taylor, "Full-field characterization of femtosecond pulses by spectrum and cross-correlation measurements," Opt. Lett. 24, 1774-1776 (1999).
[5] D. J. Kane; R. Trebino; "Characterization of arbitrary femtosecond pulses using frequency-resolved optical gating", Quantum Electronics, IEEE Journal of, vol. 29, no. 2, pp. 571-579, February 1993.
[6] R. Trebino and D. J. Kane, "Using phase retrieval to measure the intensity and phase of ultrashort pulses: frequency-resolved optical gating," J. Opt. Soc. Am. A 10, 1101-1111 (1993).
[7] C. laconic and I. A. Walmsley, "Spectral phase interferometry for direct electric-field reconstruction of ultrashort optical pulses," Opt. Lett. 23, 792-794 (1998).
[8] A. S. Wyatt, I. A. Walmsley, G. Stibenz, and G. Steinmeyer, "Sub-10 fs pulse characterization using spatially encoded arrangement for spectral phase interferometry for direct electric field reconstruction," Opt. Lett. 31, 1914-1916 (2006).
[9] J. R. Birge, Helder M. Crespo, and Franz X. Kartner, "Theory and design of two-dimensional spectral shearing interferometry for few-cycle pulse measurement," J. Opt. Soc. Am. B 27, 1165-1173 (2010).
[10] V. V. Lozovoy, I. Pastirk, and M. Dantus, "Multiphoton intrapulse interference. IV. Ultrashort laser pulse spectral phase characterization and compensation," Optics Letters, Vol. 29, pp. 775-777 (2004)
[11] V. V. Lozovoy, I. Pastirk, and M. Dantus, "Multiphoton intrapulse interference. IV. Ultrashort laser pulse spectral phase characterization and compensation," Opt. Lett. 29(7), 775-777 (2004).
[12] B. Xu, J. M. Gunn, J. M. D. Cruz, V. V. Lozovoy, and M. Dantus, "Quantitative investigation of the multiphoton intrapulse interference phase scan method for simultaneous phase measurement and compensation of femtosecond laser pulses," J. Opt. Soc. Am. B 23(4), 750-759 (2006).
[13] Y. Coello, V. V. Lozovoy, T. C. Gunaratne, B. Xu, I. Borukhovich, C.-H. Tseng, T. Weinacht, and M. Dantus, "Interference without an interferometer: a different approach to measuring, compressing, and shaping ultrashort laser pulses," J. Opt. Soc. Am. B 25(6), A140-A150 (2008).
[14] Patent application WO-A1-2013/054292
[15] M. Miranda, C. L. Arnold, Thomas Fordell, F. Silva, B. Alonso, R. Weigand, A. L'Huillier, and H. Crespo, "Characterization of broadband few-cycle laser pulses with the d-scan technique," Opt. Express 20, 18732-18743 (2012).
[16] M. Miranda, T. Fordell, C. Arnold, A. L'Huillier, and H. Crespo, "Simultaneous compression and characterization of ultrashort laser pulses using chirped mirrors and glass wedges," Opt. Express 20, 688-697 (2012).
[17] F. Silva, M. Miranda, B. Alonso, J. Rauschenberger, V. Pervak, and H. Crespo, "Simultaneous compression, characterization and phase stabilization of GW-level 1.4 cycle VIS-NIR femtosecond pulses using a single dispersion-scan setup," Optics express, 22(9), pp. 10181-10191. (2014)
[18] D. Fabris, W. Holgado, F. Silva, T. Witting, J. W. G. Tisch, and H. Crespo, "Single-shot implementation of dispersion-scan for the characterization of ultrashort laser pulses," Opt. Express 23, 32803-32808 (2015);
[19] V. Loriot, G. Gitzinger, and N. Forget, "Self-referenced characterization of femtosecond laser pulses by chirp scan," Optics Express, Vol. 21, pp. 24879-24893 (2013);
[20] D. Marquardt, "An algorithm for least-squares estimation of nonlinear parameters." Journal of the society for Industrial and Applied Mathematics 11, no. 2: 431-441 (1963);
[21] E. U. Condon, "Immersion of the Fourier transform in a continuous group of functional transformations", Proc. Natl. Acad. Sci. USA 23, 158-164 (1937);
[22] Th. Maiman, "Stimulated optical radiation in ruby," Nature 187, 493-494 (1960).

The invention claimed is:

1. A method for characterizing the spectral phase of laser pulses, the method comprising:
generating two replicas of each pulse to be characterized;
applying predetermined nonlinear spectral phase shifts to the two replicas so as to scan a dispersion range by one or both said replicas;
optically aligning the two signals of the preceding step in the same polarization plane;
applying a nonlinear optical process to the aligned signal of the preceding step;
for each of the applied spectral phases, measuring the amplitude spectrum of the resulting signal of the preceding step; and
calculating the spectral phase of the pulse to be characterized, wherein calculating the spectral phase of the pulse to be characterized includes calculating a numerical iterative algorithm for iteratively approximating the spectral phase of the pulse to be characterized, from the measured amplitude spectrum, for each of the applied spectral phases, and from a linear spectrum of the pulse to be characterized,
wherein the nonlinear optical process comprises a nonlinear effect that affects the fundamental spectrum of the pulse, and
wherein the predetermined nonlinear spectral phase shifts are applied to the two replicas so as to scan a delay range between the two replicas.

2. The method according to claim 1, wherein the predetermined nonlinear spectral phases are applied to the two replicas so as to scan a range of differential dispersion between the two replicas.

3. The method according to claim 1, further comprising:
calculating the linear spectrum of the pulse to be characterized with the calculation of the spectral phase of the pulse to be characterized.

4. The method according to claim 1, wherein optically aligning the two signals includes combining coherently the two signals.

5. The method according to claim 1, wherein the numerical iterative algorithm comprises minimizing an error function defined between the measured linear spectrum of the pulse to be characterized and a calculated linear spectrum of the pulse to be characterized, by an iterative approximation of the spectral phase of the pulse to be characterized.

6. The method according to claim 5, further comprising compensating for a non-flat spectral detection response by minimizing the error function for each wavelength, with an overall error being a weighted function of all these errors.

7. The method according to claim 1, wherein the numerical iterative algorithm comprises minimizing an error function defined between the highest frequency component along the scan axis of the measured signal and the highest frequency component along the scan axis of the calculated signal, by an iterative approximation of the spectral phase of the pulse to be characterized.

8. The method according to claim 1, wherein the numerical iterative algorithm comprises minimizing an error function defined between the second highest frequency component along the scan axis of the measured signal and the second highest frequency component along the scan axis of the calculated signal by an iterative approximation of the spectral phase of the pulse to be characterized.

9. The method according to claim 1, wherein the numerical iterative algorithm comprises minimizing an error function calculated:
locally, for each wavelength, with an overall error being a weighted function of all the local errors.

10. The method according to claim 1, wherein applying spectral phases so as to perform a scan along a range is performed between a lower limit and an upper limit of said range continuously along said range or in a stepwise fashion along said range.

11. The method according to claim 1, wherein applying spectral phases so as to perform a scan is performed with either (a) the duration of the pulse to be characterized reaching a minimum during said scan, or (b) said replicas not being synchronized during said scan.

12. The method according to claim 1, wherein applying spectral phases so as to perform a scan, applying said nonlinear optical process, and measuring said amplitude spectrum of the resulting signal is performed in a parallel for a plurality of applied spectral phases.

13. The method according to claim 1, wherein applying a numerical iterative algorithm comprises defining a function of the spectral phase of the pulse to be characterized as a discrete sampling function, a Taylor expansion function, or a Fourier series function.

14. The method according to claim 13, wherein the function of the spectral phase of the pulse to be characterized is represented by the consecutive derivatives of said function with respect to frequency.

15. The method according to claim 1, further comprising correcting for a non-flat spectral detection response by:
simulating a trace for the approximation of the pulse to be characterized at the current iteration;
comparing the simulated scan marginal to the measured scan marginal in order to calculate the spectral response to be compensated such that the numerical integral of the trace over the dispersion scan parameter, i.e. the frequency marginal, does not depend on the original spectral phase of the pulse to be characterized; and
compensating for the calculated spectral response either by dividing the experimental trace by it or by including it in the retrieval process, by multiplying it by the ideal simulated trace, in each iteration.

16. The method according to claim 1, wherein the measured resulting signal comprises a nonlinear effect that effects, a second-harmonic generation, a sum-frequency generation, or both, and wherein the measured second-harmonic generation and sum-frequency generation ("SHG/SFG") signal are calculated by:

applying an inverse Fourier transform to the spectrum of the pulse to be characterized in order to obtain the corresponding electric field in the time domain;
squaring the time-dependent electric field so as to perform the SHG/SFG calculation; and
applying a Fourier transform to obtain a spectrum of the SHG/SFG signal.

17. The method according to claim 16, wherein for the SHG/SFG calculation the spectrum is multiplied by an adequate spectral filter.

18. The method according to claim 1, wherein the laser pulses are pulses comprised in a range of 300 cycles to sub-cycle laser pulses.

19. A system for characterizing laser pulses, comprising:
a replica generator for generating two replicas of each pulse to be characterized, wherein the replica generator comprises at least two chirped mirrors and a half-wave plate or a Michelson interferometer;
a nonlinear spectral phase shifter for applying predetermined nonlinear spectral phases to the two replicas suitable for scanning a dispersion range by one or both said replicas;
an optical adder for aligning the two signals from said shifter in the same polarization plane, wherein the optical adder comprises a polarizer;
a nonlinear optical element for applying a nonlinear optical process to the signal from the optical adder;
a sensor for measuring the amplitude spectrum of the resulting nonlinear signal for each of the applied spectral phases; and
an electronic data processor configured to calculate the spectral phase of the pulse to be characterized, wherein calculating the spectral phase of the pulse to be characterized includes calculating a numerical iterative algorithm for iteratively approximating the spectral phase of the pulse to be characterized, from the nonlinear measured amplitude spectrum, for each of the applied spectral phases, and from a linear spectrum of the pulse to be characterized,
wherein the nonlinear optical process comprises a nonlinear effect that affects the fundamental spectrum of the pulse;
wherein the predetermined nonlinear spectral phases are suitable for applying to the two replicas so as to scan a delay range between the two replicas.

20. A method for characterizing the spectral phase of laser pulses, the method comprising:
generating two replicas of each pulse to be characterized;
applying predetermined nonlinear spectral phase shifts to the two replicas so as to scan a dispersion range by one or both said replicas;
optically aligning the two signals of the preceding step as two collinear beams having a temporal delay between each other;
applying a nonlinear optical process to the aligned signal of the preceding step;
for each of the applied spectral phases, measuring the amplitude spectrum of the resulting signal of the preceding step; and
calculating the spectral phase of the pulse to be characterized, wherein calculating the spectral phase of the pulse to be characterized includes calculating a numerical iterative algorithm for iteratively approximating the spectral phase of the pulse to be characterized, from the measured amplitude spectrum, for each of the applied spectral phases, and from a linear spectrum of the pulse to be characterized, wherein the nonlinear optical process comprises a nonlinear effect that affects the fundamental spectrum of the pulse, and wherein the predetermined nonlinear spectral phase shifts are applied to the two replicas so as to scan a delay range between the two replicas.

21. A method for characterizing the spectral phase of laser pulses, the method comprising:

generating two replicas of each pulse to be characterized;

applying predetermined nonlinear spectral phase shifts to the two replicas so as to scan a dispersion range by one or both said replicas;

optically imaging the two signals of the preceding step at an entrance plane of a downstream optical element;

applying a nonlinear optical process to the preceding step;

for each of the applied spectral phases, measuring the amplitude spectrum of the resulting signal of the preceding step; and calculating the spectral phase of the pulse to be characterized, wherein calculating the spectral phase of the pulse to be characterized includes calculating a numerical iterative algorithm for iteratively approximating the spectral phase of the pulse to be characterized, from the measured amplitude spectrum, for each of the applied spectral phases, and from a linear spectrum of the pulse to be characterized, wherein the nonlinear optical process comprises a nonlinear effect that affects the fundamental spectrum of the pulse, and wherein the predetermined nonlinear spectral phase shifts are applied to the two replicas so as to scan a delay range between the two replicas.

* * * * *